United States Patent
Puvvada et al.

(10) Patent No.: US 10,824,642 B2
(45) Date of Patent: Nov. 3, 2020

(54) DATA SYNCHRONIZATION ARCHITECTURE

(71) Applicant: ServiceNow, Inc., Santa Clara, CA (US)

(72) Inventors: Madhavi Puvvada, Sammamish, WA (US); Haviv Rosh, Modiin (IL); Chinna Polinati, Snoqualmie, WA (US); Akshay Patekar, Redmond, WA (US); Rukshan Parera, Bothell, WA (US)

(73) Assignee: ServiceNow, Inc., Santa Clara, CA (US)

( * ) Notice: Subject to any disclaimer, the term of this patent is extended or adjusted under 35 U.S.C. 154(b) by 372 days.

(21) Appl. No.: 15/719,200

(22) Filed: Sep. 28, 2017

(65) Prior Publication Data
US 2019/0050469 A1 Feb. 14, 2019

Related U.S. Application Data

(60) Provisional application No. 62/543,807, filed on Aug. 10, 2017.

(51) Int. Cl.
*G06F 16/00* (2019.01)
*G06F 16/27* (2019.01)
(Continued)

(52) U.S. Cl.
CPC ............ *G06F 16/27* (2019.01); *G06F 16/258* (2019.01); *G06N 5/022* (2013.01); *H04L 41/5041* (2013.01); *H04L 41/5058* (2013.01)

(58) Field of Classification Search
CPC ............ G06F 11/1658; G06F 11/1675; G06F 11/2082; G06F 11/30; G06F 11/305; G06F 16/27
See application file for complete search history.

(56) References Cited

U.S. PATENT DOCUMENTS 6,321,229 B1 11/2001 Goldman
6,609,122 B1 8/2003 Ensor
(Continued)

OTHER PUBLICATIONS

Partial European Seach Report for European Application No. 18188214.3 dated Dec. 12, 2018; 19 pgs.
(Continued)

*Primary Examiner* — Augustine K. Obisesan
(74) *Attorney, Agent, or Firm* — Fletcher Yoder PC

(57) ABSTRACT

Systems and methods for a data synchronization architecture to synchronize provide a forward synchronization of data from a helper instance to a customer facing instance and reverse synchronization of customer configuration data changes to the helper instance are disclosed. Helper instances may be configured to provide an upgrade or maintenance path for a customer facing instance. Helper instances may be a different version and have a different schema than the primary customer facing instance. Database triggers and business rules may be used to manipulate data calculated or discovered by a helper instance prior to synchronization to the primary instance. Database triggers and business rules may fire in the primary instance after each synchronization to perform necessary recalculations or adjust data associations based on data provided from the helper instance. Helper instances may queue data over time and then perform a synchronization of data from the queue.

20 Claims, 8 Drawing Sheets

(51) Int. Cl.
*G06N 5/02* (2006.01)
*G06F 16/25* (2019.01)
*H04L 12/24* (2006.01)

(56) References Cited

U.S. PATENT DOCUMENTS

| | | |
|---|---|---|
| 6,678,887 B1 | 1/2004 | Hallman |
| 6,799,189 B2 | 9/2004 | Huxoll |
| 6,816,898 B1 | 11/2004 | Scarpellli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,151,261 B2 | 4/2012 | Sirota |
| 8,224,683 B2 | 7/2012 | Manos |
| 8,266,096 B2 | 9/2012 | Navarrete |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,740 B2 | 10/2013 | Rangaranjan |
| 8,589,574 B1 * | 11/2013 | Cormie ............... G06F 3/0607 709/230 |
| 8,612,408 B2 | 12/2013 | Trinon |
| 8,646,093 B2 | 2/2014 | Myers |
| 8,674,992 B2 | 3/2014 | Poston |
| 8,689,241 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,317,327 B2 | 4/2016 | Apte |
| 9,317,518 B2 | 4/2016 | Tzadikevitch et al. |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,535,737 B2 | 1/2017 | Joy |
| 9,557,969 B2 | 1/2017 | Sharma |
| 9,613,070 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 10,002,203 B2 | 6/2018 | George |
| 2008/0141237 A1 * | 6/2008 | Elad ..................... G06F 8/656 717/171 |
| 2008/0168109 A1 * | 7/2008 | Gaurav ............... G06F 16/213 |
| 2008/0320012 A1 * | 12/2008 | Loving ............... G06F 16/213 |
| 2009/0037769 A1 * | 2/2009 | Babkin ............... G06F 16/211 714/15 |
| 2009/0055531 A1 * | 2/2009 | Brown ................ H04L 63/1416 709/225 |
| 2009/0077138 A1 * | 3/2009 | Davis .................... G06Q 10/06 |
| 2011/0029479 A1 | 2/2011 | Novak et al. |
| 2013/0086249 A1 * | 4/2013 | White .................... H04L 67/16 709/224 |
| 2016/0205518 A1 | 7/2016 | Patel et al. |
| 2017/0093640 A1 * | 3/2017 | Subramanian .......... H04L 41/12 |
| 2017/0134506 A1 | 5/2017 | Rotem et al. |
| 2017/0171306 A1 | 6/2017 | Lucas et al. |
| 2017/0373933 A1 * | 12/2017 | Subramanian ........ G06F 9/5072 |

OTHER PUBLICATIONS

Tweed, Duncan, "CMDB synchronization," BMC Discovery 11.0, Last modified Nov. 8, 2016, retrieved from the Internet: URL: https://docs.bmc.com/docs/display/disco110/CMDB+synchronization [retrieved on Aug. 9, 2017].

\* cited by examiner

DATA SYNCHRONIZATION ARCHITECTURE

CROSS-REFERENCE TO RELATED APPLICATION

This application claims priority to and the benefit of U.S. Provisional Application No. 62/543,807, entitled "DATA SYNCHRONIZATION ARCHITECTURE", filed Aug. 10, 2017, which is herein incorporated by reference in its entirety.

TECHNICAL FIELD

Embodiments described herein generally relate to cloud computing and in particular to providing an additional helper instance to assist a customer facing instance. A helper instance may execute in the "background" to assist in functionality not available or not functioning properly in the primary customer facing instance. Data synchronization techniques and controls allow for the two instances, which may be of different versions and have different schemas, to function in a coordinated manner. The synchronization techniques may include triggers that include business rules to manipulate data prior to synchronization. Additional triggers in the primary instance may follow synchronization to "re-calculate" based on the data updates made available from the helper instance.

BACKGROUND

Cloud computing relates to the sharing of computing resources that are generally accessed via the Internet. In particular, cloud computing infrastructure allows users to access a shared pool of computing resources, such as servers, storage devices, networks, applications, and/or other computing-based services. By doing so, users, such as individuals and/or enterprises, are able to access computing resources on demand that are located at remote locations in order to perform a variety of computing functions that include storing and/or processing computing data. For enterprise and other organization users, cloud computing provides flexibility in accessing cloud computing resources without accruing up-front costs, such as purchasing network equipment and investing time in establishing a private network infrastructure. Instead, by utilizing cloud computing resources, users are able redirect their resources to focus on core business functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of business and/or information technology (IT) related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate business operations without maintaining network infrastructure and/or allocating computing resources normally associated with these functions.

Within the context of cloud computing solutions, support personnel may be asked to deal with higher expectations of response time to infrastructure issues. The goal of most business systems, and cloud computing systems in particular, is very high availability. Accordingly, users of business systems have grown accustom to nearly 100% availability of all business functions. One important aspect of maintaining such high availability is the ability to accurately and quickly address software upgrades and maintenance in a controlled manner with minimal disruption to the customer. The disclosed techniques for making available helper instances and specialized synchronization methods address these and other issues.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
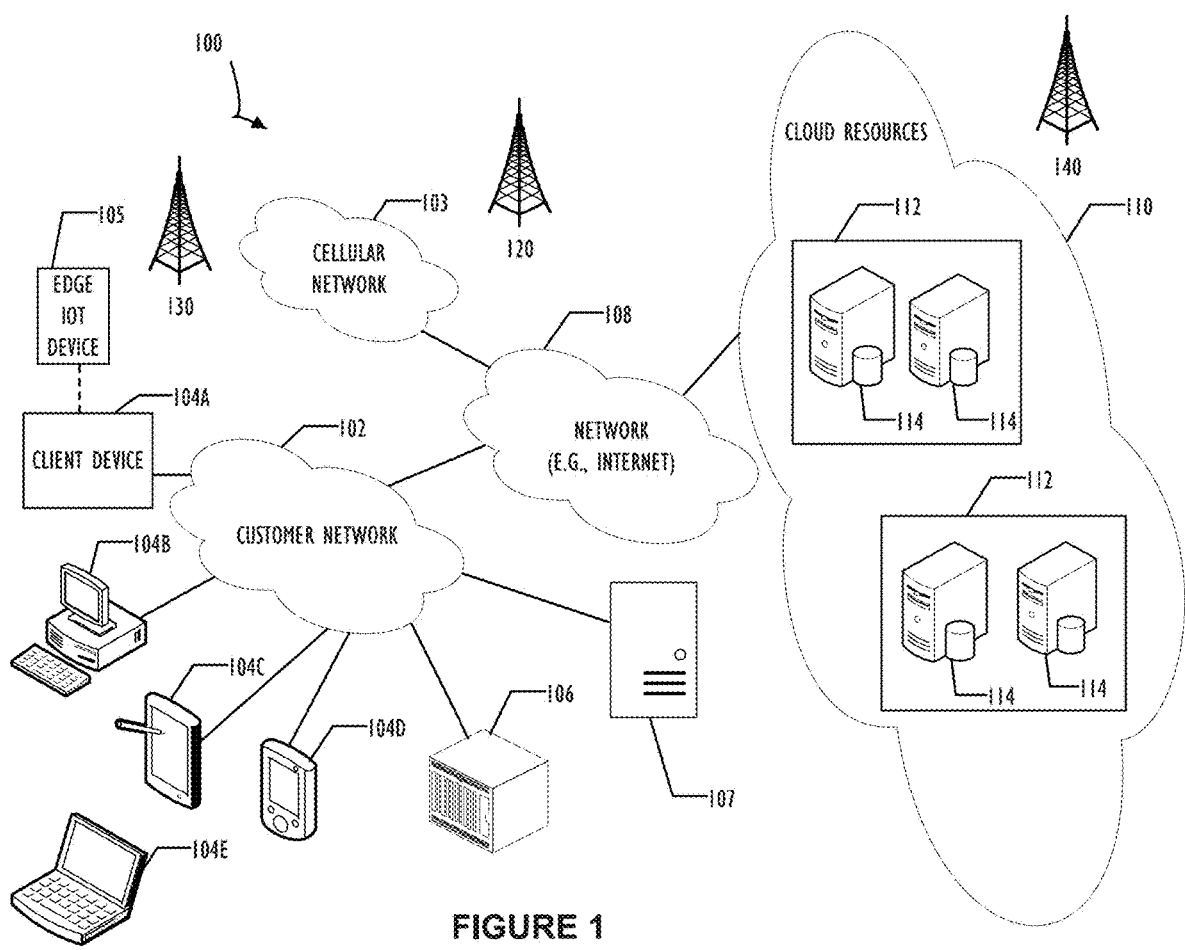
FIG. 1 illustrates a block diagram of an embodiment of a cloud computing infrastructure 100 where embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to, a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

Business Service Management (BSM) sometimes referred to as simply Service Management (SM) refers to a field of information technology (IT) administration that ties particular portions of an IT infrastructure (referred to as Configuration Items (CIs)) to a function provided by the business. For example, a business may be divided functionally into a set of services that the business provides internally and externally. Typically, in a large corporation there are several Business Units (BUs) and each BU may include one or more services. Examples of internal functions that support a business include but are not limited to, human resources and finance. Examples of external functions that support a business include but are not limited to, product delivery, logistics, e-commerce, and customer support. Obviously, some of these functions have both internal and external components. One goal of SM is to identify what functions make up a service and, in turn, which CIs support those function within the IT infrastructure. Having such a view may allow prioritization of IT tasks such as trouble shooting, upgrade, and maintenance in a manner that best supports overall business goals. The view tying CIs to business functions may, for example, be represented in a visual graph or a mathematical model referred to as a business service map or simply a Service Map.

As mentioned above, CIs represent portions of an IT infrastructure. A portion of an IT infrastructure may be confined to an individual server, router, data storage unit, or other physical IT component. Alternatively, a portion of an IT infrastructure may be considered as a logical abstraction of a group of physical IT components providing a function, for example, a data base or web service. A data base containing employee records could then be included in a service map for one or more human resources functions of the business (e.g., payroll, benefits, etc.). Similarly, a web service supporting e-commerce could be a CI included in a service map representing a customer facing web sales business function.

Discovery of business services within a network may be done in several ways. Two methods of discovery include pattern matching and network monitoring. Pattern matching may include analysis of applications and their configuration files. To perform pattern matching domain specific knowledge may be required to identify how to parse configuration files so as to identify the desired information. Network monitoring includes analysis of network traffic between different CIs within a given network. By analyzing how CIs communicate with each other it can be possible to identify dependencies of CIs on each other and make educated guesses to build a service map. Either of these techniques may not be completely accurate and continued running of a discovery process may be able to provide suggestions to, or automatically refine, a service map. Also, network monitoring may be susceptible to "artificially" putting in extraneous communication/dependency paths for several reasons. For example, communications between CIs may be identified and inappropriately associated with one or more business services for which they provide no benefit. These extraneous communications may overly complicate a service map and once determined to represent "noise" in the service map may be automatically removed or flagged for review and subsequently removed as desired. Removal of noise connections in a service map may provide a simplified and more accurate view to all users of the service map.

The above examples of service mapping and discovery are but one illustration of complex functions that may be performed within a customer instance. As the technology surrounding service mapping is enhanced and improved, it may be desirable to allow this new functionality to be made available to customer instances without requiring a complete upgrade of that customer instance. In this disclosure, service mapping and discovery will be used as an example function to be implemented using the disclosed helper instance and data synchronization techniques. This in no way limits this disclosure because other functions may be implemented using some or all techniques disclosed herein. Additionally, for purposes of this disclosure, helper instances providing discovery and service mapping will be implemented in a different instance version having a different schema than the primary customer instance. This example reflects a real-world scenario where an upgraded discovery and mapping function are available to replace a corresponding capability within a production primary customer instance. Accordingly, the helper instance may then execute in coordination (e.g., parallel with synchronization) with the production primary customer instance and allow the customer to benefit from the improvement without having to upgrade their entire operational environment. Further information about a specific example helper instance is discussed below with reference to FIG. 4.

FIG. 1 illustrates a block diagram of an embodiment of a cloud computing infrastructure 100 where embodiments of the present disclosure may operate. Cloud computing infrastructure 100 comprises a customer network 102, network 108, and a cloud resources platform/network 110. In one embodiment, the customer network 102 may be a local private network, such as local area network (LAN) that includes a variety of network devices that include, but are not limited to, switches, servers, and routers. Each of these networks can contain wired or wireless programmable devices and operate using any number of network protocols (e.g., TCP/IP) and connection technologies (e.g., WiFi® networks, Bluetooth®). Wi-Fi is a registered trademark of the Wi-Fi Alliance. Bluetooth is a registered trademark of Bluetooth Special Interest Group. In another embodiment, customer network 102 represents an enterprise network that could include or be communicatively coupled to one or more local area networks (LANs), virtual networks, data centers, and/or other remote networks (e.g., 108, 112). As shown in FIG. 1, customer network 102 may be connected to one or more client devices 104A-E and allow the client devices to communicate with each other and/or with cloud resources platform/network 110. Client devices 104A-E may be computing systems such as desktop computer 104B, tablet computer 104C, mobile phone 104D, laptop computer (shown as wireless) 104E, and/or other types of computing systems generically shown as client device 104A. Cloud computing infrastructure 100 may also include other types of devices generally referred to as Internet of Things (IoT) (e.g., edge IOT device 105) that may be configured to send and receive information via a network to access cloud computing services or interact with a remote web browser application (e.g., to receive configuration information). FIG. 1 also illustrates that customer network 102 may be connected to a local compute resource 106 that may include a server, access point, router, or other device configured to provide for local computational resources and/or to facilitate communication amongst networks and devices. For example, local compute resource 106 may be one or more physical local hardware devices configured to communicate with wireless network devices and/or facilitate communication of data between customer network 102 and other networks such as network 108 and cloud resources platform/network 110. Local compute resource 106 may also facilitate communication between other external applications, data sources, and services, and customer network 102. FIG. 1 also illustrates that customer network 102 may be connected to a computer configured to execute a management, instrumentation, and discovery (MID) server 107. For example, MID server 107 may be a Java application that runs as a Windows service or UNIX daemon. MID server 107 may be configured to assist functions such as, but not necessarily limited to, discovery, orchestration, service mapping, service analytics, and event management. MID server 107 may be configured to perform tasks for a cloud-based instance while never initiating communication directly to the cloud-instance by utilizing a work queue architecture. This configuration may assist in addressing security concerns by eliminating that path of direct communication initiation.

Cloud computing infrastructure 100 also includes cellular network 103 for use with mobile communication devices. Mobile cellular networks support mobile phones and many other types of mobile devices such as laptops etc. Mobile devices in cloud computing infrastructure 100 are illustrated as mobile phone 104D, laptop 104E, and tablet 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices, such as wireless access points and routers (e.g., local compute resource 106). In addition, the mobile devices may interact with other mobile devices or with non-mobile devices such as desktop computer 104B and various types of client devices 104A for desired services. Although not specifically illustrated in FIG. 1, customer network 102 may also include a dedicated network device (e.g., gateway or router) or a combination of network devices that implement a customer firewall or intrusion protection system.

FIG. 1 illustrates that customer network 102 is coupled to a network 108. Network 108 may include one or more computing networks available today, such as other LANs, wide area networks (WANs), the Internet, and/or other remote networks, in order to transfer data between client devices 104A-E and cloud resources platform/network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, cloud resources platform/network 110 is illustrated as a remote network (e.g., a cloud network) that is able to communicate with client devices 104A-E via customer network 102 and network 108. The cloud resources platform/network 110 acts as a platform that provides additional computing resources to the client devices 104A-E and/or customer network 102. For example, by utilizing the cloud resources platform/network 110, users of client devices 104A-E may be able to build and execute applications, such as automated processes for various business, IT, and/or other organization-related functions. In one embodiment, the cloud resources platform/network 110 includes one or more data centers 112, where each data center 112 could correspond to a different geographic location. Within a particular data center 112 a cloud service provider may include a plurality of server instances 114. Each server instance 114 may be implemented on a physical computing system, such as a single electronic computing device (e.g., a single physical hardware server) or could be in the form a multi-computing device (e.g., multiple physical hardware servers). Examples of server instances 114 include, but are not limited to, a web server instance (e.g., a unitary Apache installation), an application server instance (e.g., unitary Java Virtual Machine), and/or a database server instance (e.g., a unitary MySQL catalog).

To utilize computing resources within cloud resources platform/network 110, network operators may choose to configure data centers 112 using a variety of computing infrastructures. In one embodiment, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple customer instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causing outages for all customers allocated to the single server instance 114.

In another embodiment, one or more of the data centers 112 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each customer instance. In a multi-instance cloud architecture, multiple customer instances could be installed on a single physical hardware server where each customer instance is allocated certain portions of the physical server resources, such as computing memory, storage, and processing power. By doing so, each customer instance has its own unique software stack that provides the benefit of data isolation, relatively less downtime for customers to access the cloud resources platform/network 110, and customer-driven upgrade schedules. An example of implementing a customer instance within a multi-instance cloud architecture will be discussed in more detail below when describing FIG. 2.

Figure 2:
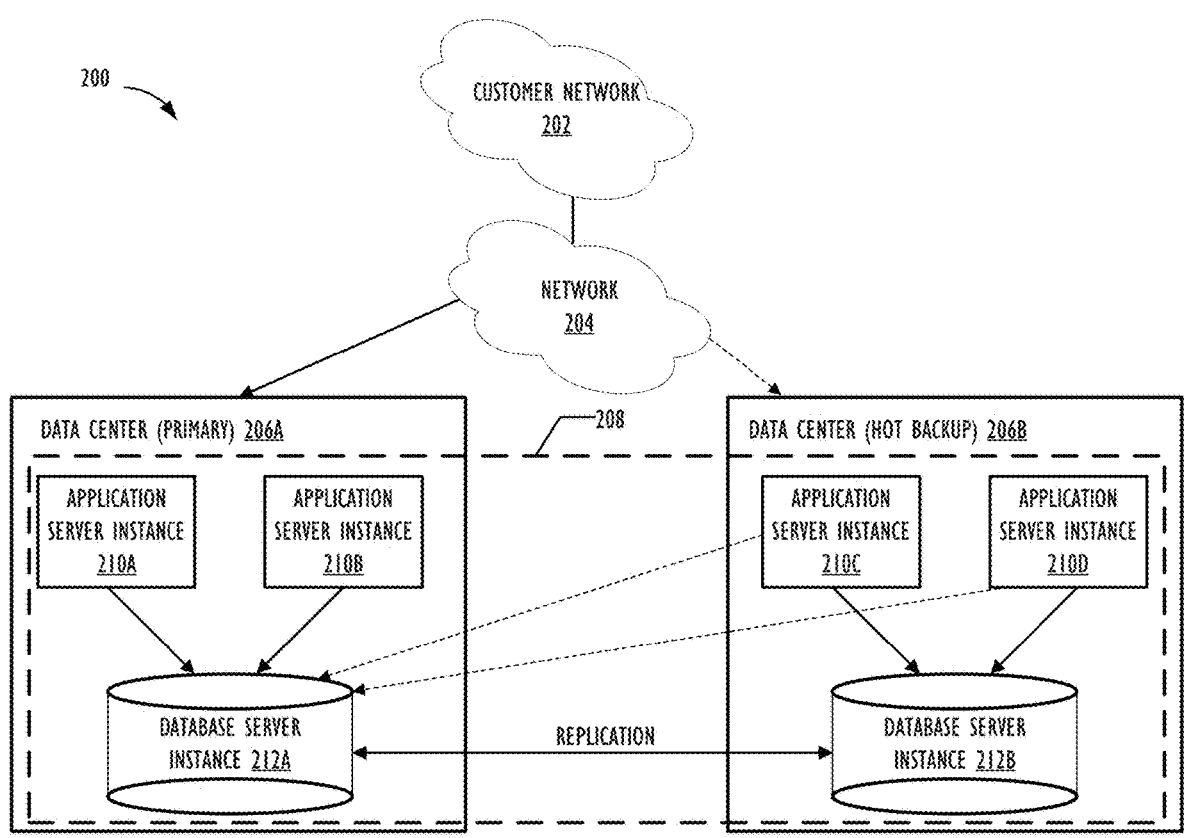
FIG. 2 illustrates a block diagram of an embodiment of a multi-instance cloud architecture 200 where embodiments of the present disclosure may operate.

FIG. 2 illustrates a block diagram of an embodiment of a multi-instance cloud architecture 200 where embodiments of the present disclosure may operate. FIG. 2 illustrates that the multi-instance cloud architecture 200 includes a customer network 202 that connects to two data centers 206A and 206B via network 204. Customer network 202 and network 204 may be substantially similar to customer network 102 and network 108 as described in FIG. 1, respectively. Data centers 206A and 206B can correspond to FIG. 1's data centers 112 located within cloud resources platform/network 110. Using FIG. 2 as an example, a customer instance 208 is composed of four dedicated application server instances 210A-210D and two dedicated database server instances 212A and 212B. Stated another way, the application server instances 210A-210D and database server instances 212A and 212B are not shared with other customer instances 208. Other embodiments of the multi-instance cloud architecture 200 could include other types of dedicated server instances, such as a web server instance. For example, the customer instance 208 could include the four dedicated application server instances 210A-210D, two dedicated database server instances 212A and 212B and four dedicated web server instances (not shown in FIG. 2).

To facilitate higher availability of the customer instance 208, application server instances 210A-210D and database server instances 212A and 212B are shown to be allocated to two different data centers 206A and 206B, where one of data centers 206A and 206B may act as a backup data center. In reference to FIG. 2, data center 206A acts as a primary data center that includes a primary pair of application server instances 210A and 210B and primary database server instance 212A for customer instance 208, and data center 206B acts as a secondary data center to back up primary data center 206A for a customer instance 208. To back up primary data center 206A for customer instance 208, secondary data center 206B includes a secondary pair of application server instances 210C and 210D and a secondary database server instance 212B. Primary database server instance 212A is able to replicate data to secondary database server instance 212B. As shown in FIG. 2, primary database server instance 212A replicates data to secondary database server instance 212B using a replication operation such as, for example, a Master-Master MySQL Binlog replication operation. The replication of data between data centers could be implemented in real time or by implementing full backup weekly and daily incremental backups in both data centers 206A and 206B. Having both a primary data center 206A and secondary data center 206B allows data traffic that typically travels to the primary data center 206A for the customer instance 208 to be diverted to the second data center 206B during a failure and/or maintenance scenario. Using FIG. 2 as an example, if application server instances 210A and 210B and/or primary data server instance 212A fails and/or is under maintenance, data traffic for customer instances 208 can be diverted to secondary application server instances 210C and 210D and secondary database server instance 212B for processing.

Although FIGS. 1 and 2 illustrate specific embodiments of a cloud computing system 100 and a multi-instance cloud architecture 200, respectively, the disclosure is not limited to the specific embodiments illustrated in FIGS. 1 and 2. For instance, although FIG. 1 illustrates that cloud resources platform/network 110 is implemented using data centers, other embodiments of the of the cloud resources platform/network 110 are not limited to data centers and can utilize other types of remote network infrastructures. Moreover, other embodiments of the present disclosure may combine one or more different server instances into a single server instance. Using FIG. 2 as an example, application server instances 210A-210D and database server instances 212A-212B can be combined into a single server instance. The use and discussion of FIGS. 1 and 2 are only examples to facilitate ease of description and explanation.

Figure 3A:
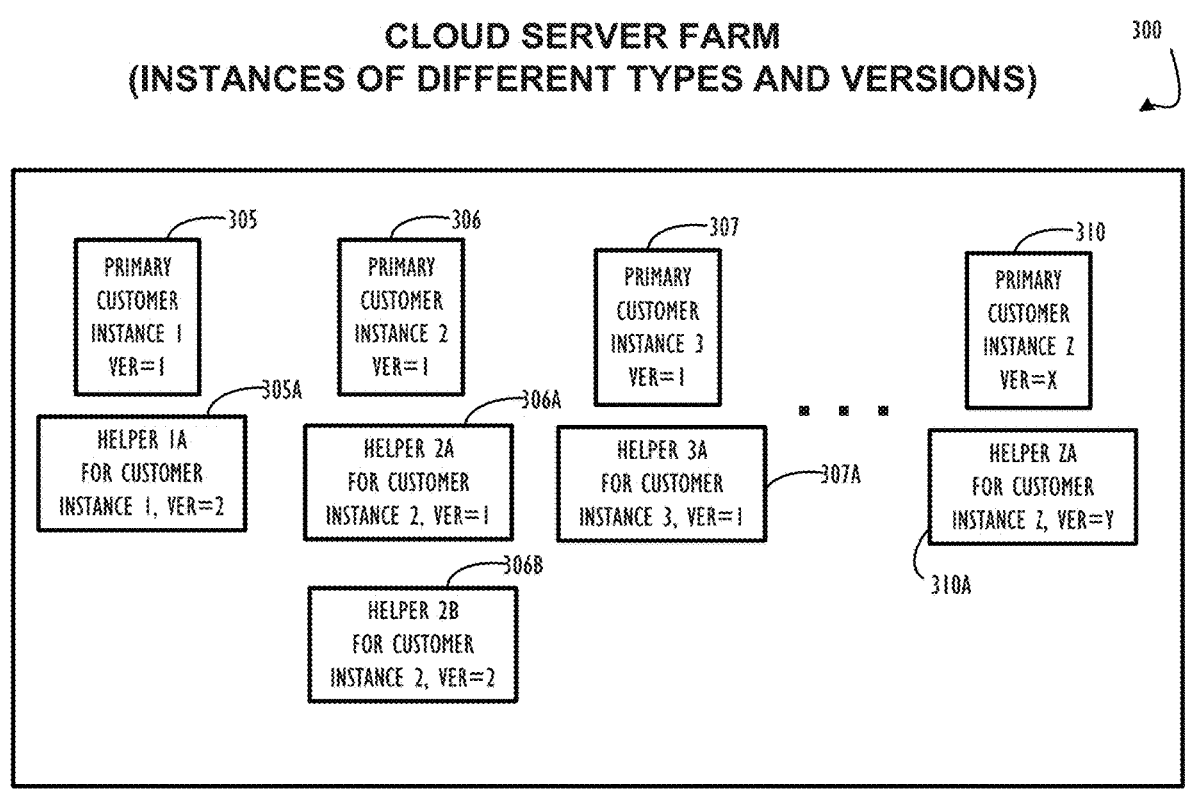
FIGS. 3A-3B illustrate block diagrams 300 and 315 of an embodiment of instances, associated helper instances, and a possible synchronization flow outlining one possible configuration for a plurality of primary and helper instances according to an embodiment of the present disclosure.

Referring now to FIG. 3A, block diagram 300 illustrates one possible configuration of a plurality of customer instances and associated helper instances according to some disclosed embodiments. Any number of primary instances may exist within a given server farm and each of those primary instances may have one or more helper instances of the same or different versions and schemas. Primary customer instance 1 (305) is shown at version 1 and has associated helper instance 1A (305A) at version 2 which is different than the version of its primary customer instance. Primary customer instance 2 (306) in this example has two helper instances 306A and 306B. Helper instance 2A (306A) is at version 1 which is the same version as primary customer instance 2. Helper instance 2B (306b) is at version 2. Primary customer instance 3 (307) has helper instance 3A (307A) both at version 1. Finally, primary customer instance Z (310) is at version X and its helper instance ZA (310A) is at version Y. When helper instances are at the same version as their associated primary instances (e.g., 307 and 307A), data synchronization may be but is not necessarily simplified because each schema may be the same. In some cases, when using a helper instance the typical scoping rules of a multi-tenant cloud architecture may be changed to allow the helper instance to access information from within its corresponding primary instance. For example, a helper instance may be a globally scoped application within the cloud architecture. Also, because helper instances may be configured with global scope, a cloud service provider may have to provide alternative security measures to isolate and protect data from different customers executing concurrently.

Figure 3B:
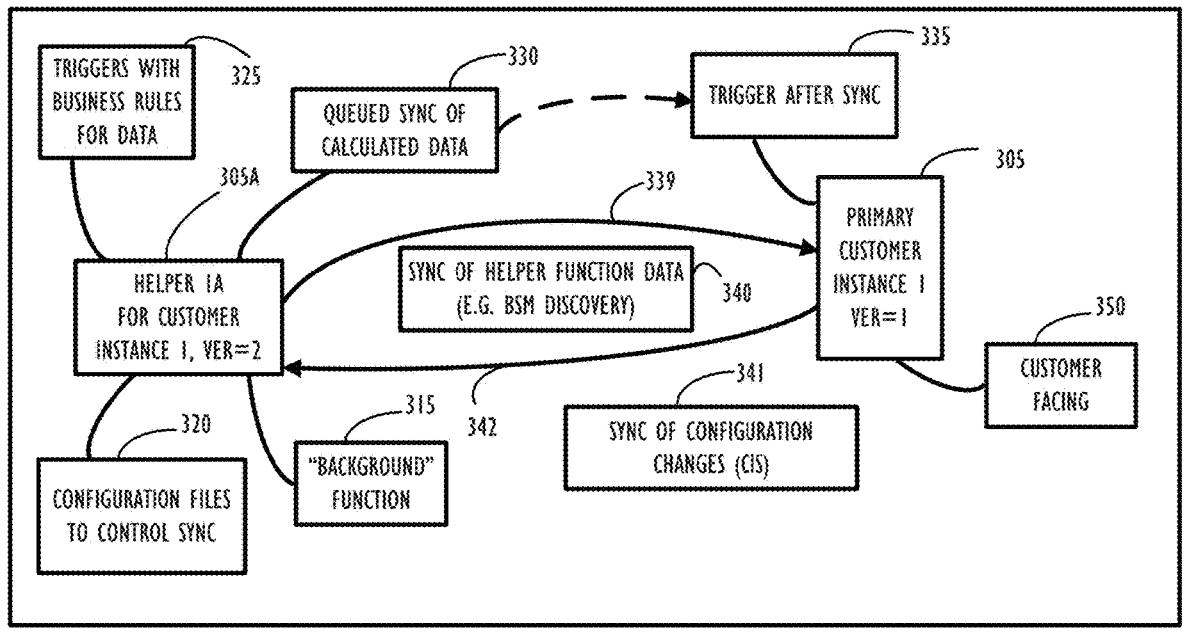

Referring now to FIG. 3B, block diagram 315 illustrates a possible synchronization flow between primary customer instance 1 (305) at version 1 and helper instance 1A (305A) at version 2 (See FIG. 3A). As shown by block diagram 315, helper instance 1A (305A) in this example is configured to operate as a "background" function. That is, there are no direct customer facing components of helper instance 1A (305A) in this example. The capabilities of helper instance 1A (305A) (e.g., BSM discovery functions) operate separately from the customer facing (see block 350) primary customer instance 1 (305). Although the functions of helper instance 1A are stated to operate separately, helper instance 1A (305A) and primary customer instance 1 (305) coordinate their functions utilizing the disclosed synchronization architecture.

In the example of FIG. 3B, helper instance 1A (305A) includes block 320 representing a set of one or more configuration files to control forward synchronization of data related to service management discovery. This data may include information from any number of discovery techniques including the pattern matching and network monitoring techniques discussed above. As helper instance 1A (305A) performs discovery functions and updates any associated mapping data structures, block 325 indicates that triggers may be executed within the data structures of helper instance 1A (305A). These triggers may include business rules to manipulate the data and adjust for any schema differences prior to placing data for synchronization into a data queue (block 330). Periodically, or once a set of data has been collected and queued, block 340 and its associated arrow indicate that data from the helper function such as BSM discovery is synced in the forward direction (shown by arrow 339) to associated primary customer instance 1 (305). After the queued data is synchronized from helper instance 1A (305A) to primary customer instance 1 (305) a trigger 335 within primary customer instance 1A (305) may be used to recalculate information or adjust any data linkages within other tables of the data base in primary customer instance 1A (305). Block 341 illustrates that a synchronization of configuration changes that may have been made in the customer facing primary customer instance 1 (305) may need to be reverse synced (shown by arrow 342) to helper instance 1A (305). For example, if a customer has identified a connection between two CIs as noise and not to be associated with a particular service map, that information may need to be provided back to helper instance 1A (305) which in this example is performing service map discovery functions. Please note, the use of the terms "forward" and "backward/reverse" are illustrative only and are meant to indicate that collected and calculated data is pushed from a helper instance (forward synchronization) and configuration changes that originate from a customer (or within the customer facing instance) are pushed to the helper instance (backward or reverse synchronization).

Figure 4:
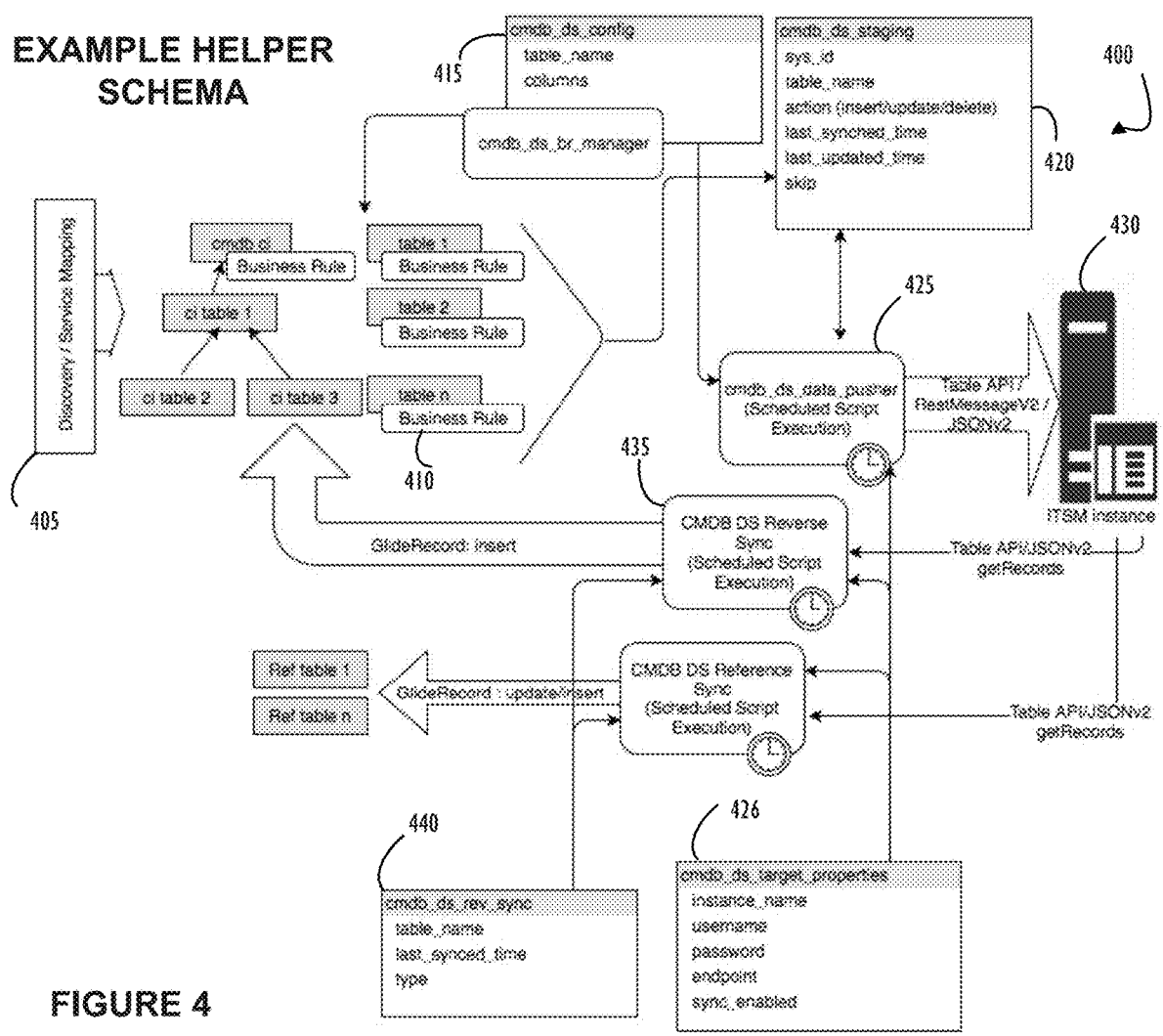
FIG. 4 illustrates a block diagram 400 of an example helper schema configured to perform discovery and service mapping functions for business service management (BSM) functionality according to one or more disclosed embodiments.

Referring now to FIG. 4, block diagram 400 illustrates example configuration tables and possible flow of information for an example helper instance performing discovery and service mapping according to one or more disclosed embodiments. Block 405 illustrates a discovery and service mapping function that interfaces with a plurality of data base tables. As illustrated at block 410 some of the tables may include, or be associated with, triggers and business rules that execute when updates are made to them. Block 415 illustrates a cmdb_ds_config table containing table names and columns pertinent to this particular synchronization. Block 420 illustrates a cmdb_ds_staging component that includes information about current and previous synchronizations and interfaces with element 425 representing cmdb_ds_data_pusher. Cmdb_ds_data_pusher 425, in this example, initiates and controls synchronization via scheduled script execution to perform forward synchronization of discovery and service mapping information into information technology service management (ITSM) instance 430 (e.g., primary customer instance). Block 426 cmdb_ds_target_properties contains control and access information used by cmdb_ds_data_pusher 425 such as usernames and passwords. Block 435 illustrates CMDSB_DS_Reverse sync which may also be scheduled and illustrates the reverse sync of information as discussed above. Finally, block 440 illustrates cmdb_ds_rev_sync as a control table containing information pertaining to one or more reverse synchronization executions. In this example, changing a record in cmdb_ds_config 415 triggers a business rule, which in turn programmatically manages (inserts/deletes) a business rule on the root table of the table hierarchy containing the table mentioned in the record in the case of cmd_ci hierarchy. Otherwise, the business rule will be created on the exact table mentioned in the cmdb_ds_config 415 table. This programmatic creation/deletion business rule requires the application to be global in scope. In one embodiment the name of this business rule is the sys_id of the scoped application. Table cmdb_ds_target_properties 426 should be populated with the username, password and endpoint URL for the target primary customer instance (in this case an ITSM instance). Cmdb_ds_target_properties 426 contains a Boolean field called sync_enabled which can be used by cmdb_ds_data_pusher 425 job to decide if data should be pushed into the ITSM instance 430 or not. Continuing with this example, a possible workflow could include invoking the business rule on the root table whenever there is a change in any record of the source table under the cmdb_ci hierarchy. This business rule will populate cmdb_ds_staging table 420 with sys_id as sys_id of the record in the source table and last_updated_time as sys_updated_on of that record. The scheduled job cmdb_ds_data_pusher 425 will get invoked at scheduled times, which can be configured. Cmdb_ds_data_pusher 425 will first look for all records in cmdb_ds_staging 420 table with last_updated_time>last_synced_time. Second, cmdb_ds_data_pusher 425 will generate payloads for each table and corresponding POST/PUT/DELETE API call. Third, cmdb_ds_pusher 425 will utilize JSONv2 for populating data into a target primary customer instance. Fourth, cmdb_ds_pusher 425 will receive a response back and update cmdb_ds_staging 420 Table's last_synced_time with the time when the payload (e.g., data values from source tables) was generated for the successfully updated sys_id.

Figure 5:
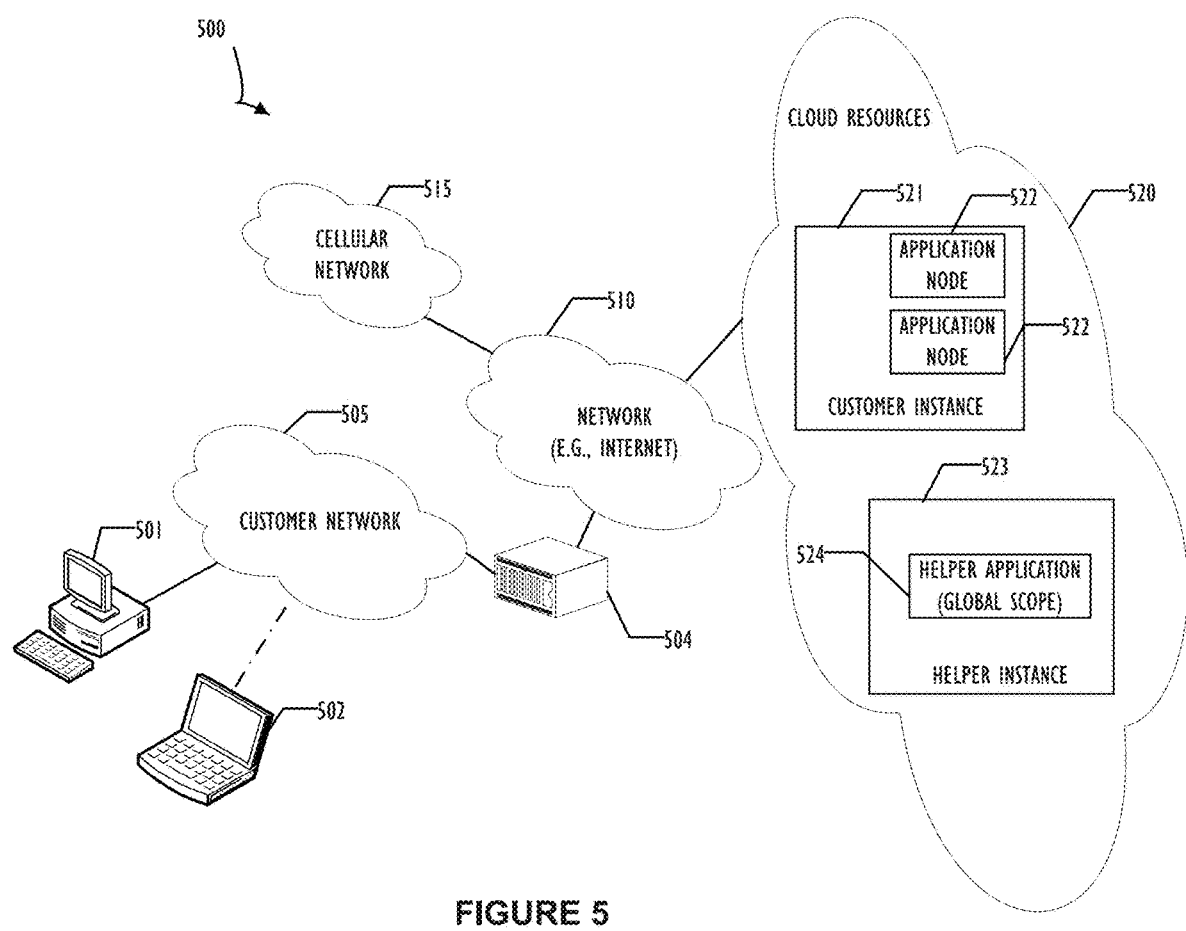
FIG. 5 illustrates a cloud-based architecture 500 including a primary customer instance and a globally scoped helper instance according to one or more disclosed embodiments.

FIG. 5 illustrates an architecture 500 where a primary customer facing instance 521 may have one or more application nodes 522 and interact with helper instance 523 having a globally scoped helper application 524 each executing within cloud resources 520. Cloud resources 520 may, for example, be provided by a cloud services network provider. Architecture 500 includes three example networks that are similar to those discussed above with respect to FIG. 1. Architecture 500 includes customer network 505, connectivity network 510 (e.g., the Internet), and cellular network 515. Additional networks may provide further connectivity but are not explicitly shown. Customer network 505 is connected to external networks through firewall 504 to improve security. Customer network 505 communicates with end-users via personal computer 501 or laptop computer 502. Clearly, other end-user devices are contemplated such as smartphones or tablets communicating via customer network 505 or cellular network 515.

Figure 6:
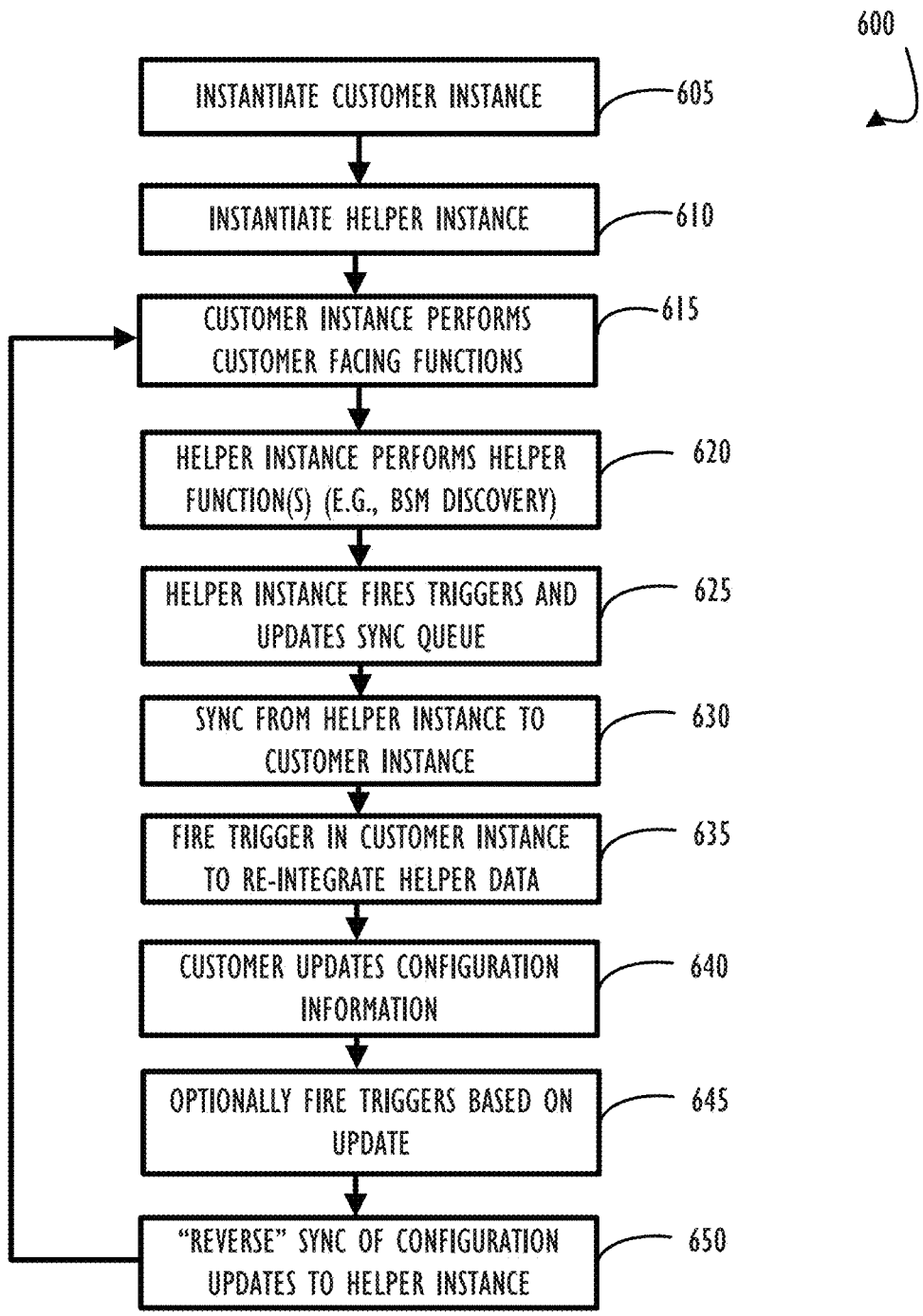
FIG. 6 illustrates a flowchart 600 representing one possible flow for queuing data for forward and reverse synchronization, for example using architecture 500 of FIG. 5, according to one or more disclosed embodiments.

FIG. 6 illustrates a flowchart 600 representing one possible flow for synchronization between a primary customer facing instance (e.g., 305) and a helper instance configured to perform BSM discovery as an example (e.g., 305A) according to one or more disclosed embodiments. A similar flow for synchronization could be utilized for other types of helper instances. Beginning at block 605, a customer instance is made available in a cloud service provider infrastructure. Block 610 illustrates that a helper customer instance is also made available. As shown in block 615, this example indicates that the primary customer facing instance performs customer facing functions and by extension the example helper instance may execute in a background manner. Block 620 illustrates that concurrent with the primary customer instance performing its customer facing functions, the helper instance performs helper unique functions. Block 625 indicates that the helper instance operates and fires triggers as needed to update an internal synchronization queue. The internal synchronization queue contains content or information that is later provided to the primary customer instance. Block 630 indicates that at a scheduled time, periodically, or on demand, a synchronization function is performed from the helper instance to the primary customer instance. Block 635 indicates that (optionally) a trigger may be fired in the primary instance after the synchronization of block 630 to re-integrate any information provided from the helper instance. Block 640 illustrates that a customer may alter configuration information in the primary instance that has an impact on a given helper functionality. If this is the case, the primary customer instance may track this by utilizing a trigger based on the update of a data base table as shown at block 645. Block 650 illustrates that a "reverse" synchronization of this configuration information may be initiated to update the helper instance. Flow then may loop back to block 615. Clearly, not all helper instances will require or need a "reverse" synchronization capability and thus will have a one-way forward synchronization only.

Figure 7:
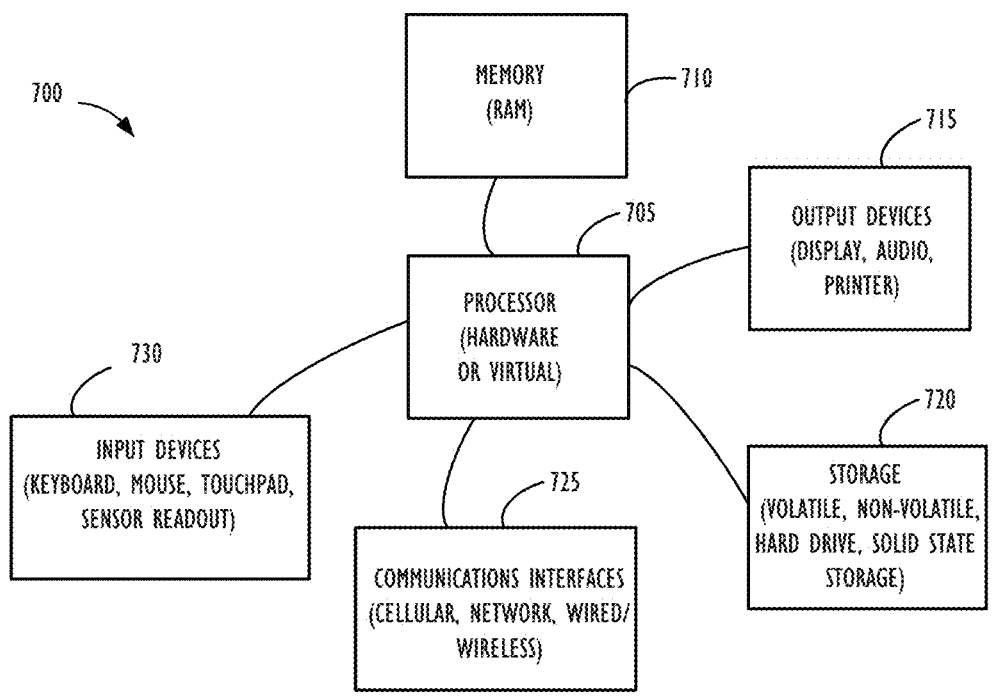
FIG. 7 illustrates a high-level block diagram 700 of a processing device (computing system) that may be used to implement one or more disclosed embodiments.

FIG. 7 illustrates a high-level block diagram 700 of a processing device (computing system) that may be used to implement one or more disclosed embodiments (e.g., service provider cloud infrastructure 110, client devices 104A-104E, server instances 112, data centers 206A-206B, etc.). For example, computing device 700, illustrated in FIG. 7, could represent a client device or a physical server device and could include either hardware or virtual processor(s) depending on the level of abstraction of the computing device. In some instances (without abstraction) computing device 700 and its elements as shown in FIG. 7 each relate to physical hardware and in some instances one, more, or all of the elements could be implemented using emulators or virtual machines as levels of abstraction. In any case, no matter how many levels of abstraction away from the physical hardware, computing device 700 at its lowest level may be implemented on physical hardware. As also shown in FIG. 7, computing device 700 may include one or more input devices 730, such as a keyboard, mouse, touchpad, or sensor readout (e.g., biometric scanner) and one or more output devices 715, such as displays, speakers for audio, or printers. Some devices may be configured as input/output devices also (e.g., a network interface or touchscreen display). Computing device 700 may also include communications interfaces 725, such as a network communication unit that could include a wired communication component and/or a wireless communications component, which may be communicatively coupled to processor 705. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 7, processing device 700 includes a processing element, such as processor 705, that contains one or more hardware processors, where each hardware processor may have a single or multiple processor cores. In one embodiment, the processor 705 may include at least one shared cache that stores data (e.g., computing instructions) that are utilized by one or more other components of processor 705. For example, the shared cache may be a locally cached data stored in a memory for faster access by components of the processing elements that make up processor 705. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) microprocessor. Although not illustrated in FIG. 7, the processing elements that make up processor 705 may also include one or more other types of hardware processing components, such as graphics processing units (GPUs), application specific integrated circuits (ASICs), field-programmable gate arrays (FPGAs), and/or digital signal processors (DSPs).

FIG. 7 illustrates that memory 710 may be operatively and communicatively coupled to processor 705. Memory 710 may be a non-transitory medium configured to store various types of data. For example, memory 710 may include one or more storage devices 720 that comprise a non-volatile storage device and/or volatile memory. Volatile memory, such as random access memory (RAM), can be any suitable non-permanent storage device. The non-volatile storage devices 720 can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage devices 720 may be used to store overflow data if allocated RAM is not large enough to hold all working data. The non-volatile storage devices 720 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 705. In one embodiment, the compiling process of the software program may transform program code written in a programming language to another computer language such that the processor 705 is able to execute the programming code. For example, the compiling process of the software program may generate an executable program that provides encoded instructions (e.g., machine code instructions) for processor 705 to accomplish specific, non-generic, particular computing functions.

After the compiling process, the encoded instructions may then be loaded as computer executable instructions or process steps to processor 705 from storage 720, from memory 710, and/or embedded within processor 705 (e.g., via a cache or on-board ROM). Processor 705 may be configured to execute the stored instructions or process steps in order to perform instructions or process steps to transform the computing device into a non-generic, particular, specially programmed machine or apparatus. Stored data, e.g., data stored by a storage device 720, may be accessed by processor 705 during the execution of computer executable instructions or process steps to instruct one or more components within the computing device 700.

A user interface (e.g., output devices 715 and input devices 730) can include a display, positional input device (such as a mouse, touchpad, touchscreen, or the like), keyboard, or other forms of user input and output devices. The user interface components may be communicatively coupled to processor 705. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 700 may comprise other components well known in the art, such as sensors, powers sources, and/or analog-to-digital converters, not explicitly shown in FIG. 7.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

The subject matter of this disclosure may be applicable to numerous use cases that have not been explicitly discussed here but are contemplated by this disclosure. For example, the provisional applications filed by the same applicant on May 4, 2017 and May 5, 2017 entitled "Service Platform and use thereof" have further examples. The U.S. Provisional applications given filing Ser. Nos. 62/501,646; 62/501,657; 62/502,258; 62/502,308; and 62/502,244 are hereby incorporated by reference.

What is claimed is:

1. A cloud-based computer system, comprising:
   a memory partition;
   a network interface communicatively coupled to one or more processing units and the memory partition, wherein the memory partition comprises computer instructions that when executed by the one or more processing units cause the cloud-based computer system to:
   provide a hosted client primary instance to a remote client device, wherein the hosted client primary instance is configured to communicatively couple to the remote client device via the network interface, and wherein the hosted client primary instance comprises a plurality of configuration items and a plurality of applications;
   provide a hosted discovery helper instance to the remote client device, wherein the hosted discovery helper instance is configured to communicatively couple to the hosted client primary instance;
   recognize, in the hosted discovery helper instance, communications between the at least two of the applications in the hosted client primary instance;
   identify, in the hosted discovery helper instance, communication paths between two or more of the configuration items based on the recognized communications of the at least two of the applications, wherein the communication paths are associated with a service management function;
   associate, in the hosted discovery helper instance, the service management function in a service map containing the two or more configuration items and the identified communication paths;
   update a first data structure in the hosted discovery helper instance to reflect the association in the service map;
   invoke, in the hosted discovery helper instance, one or more business rules based on the update of the first data structure, wherein the one or more business rules is configured to adjust for a schema difference between the first data structure and a second data structure in the hosted client primary instance prior to adding information to a queue, wherein the schema difference between the first data structure and the second data structure is attributable to the update of the first data structure without updating the second data structure;
   synchronize, based on the information added to the queue, information from the first data structure in the hosted discovery helper instance with the second data structure in the hosted client primary instance; and
   initiating a trigger in the hosted client primary instance to recalculate service mapping information in the hosted client primary instance based on the one or more business rules and to make the recalculated service mapping information available to other functions executing in the hosted client primary instance.

2. The cloud-based computer system of claim 1, wherein the hosted client primary instance and the hosted discovery helper instance are of different instance versions.

3. The cloud-based computer system of claim 1, wherein the hosted client primary instance and the hosted discovery helper instance have databases that use different schemas.

4. The cloud-based computer system of claim 1, wherein the computer instructions further cause the cloud-based computer system to receive an update, via the remote client device, to a configuration item.

5. The cloud-based computer system of claim 4, wherein the update indicates addition of a new configuration item causing an update to a table in the hosted client primary instance.

6. The cloud-based computer system of claim 5, wherein the update to the table initiates execution of a trigger containing business logic to update a reverse synchronization control queue.

7. The cloud-based computer system of claim 6, wherein the computer instructions further cause the cloud-based computer system to synchronize, based on the information in the reverse synchronization control queue, information, corresponding to the addition of the new configuration item, from the hosted client primary instance to the hosted discovery helper instance, the information adding the new configuration item to a data base in the hosted discovery helper instance.

8. The cloud-based computer system of claim 1, wherein the communications between at least two of the applications recognized in the hosted discovery helper instance are recognized using network monitoring techniques.

9. The cloud-based computer system of claim 1, wherein the communications between at least two of the applications recognized in the hosted discovery helper instance are recognized using pattern matching techniques.

10. A method of upgrading capability of a primary instance in a cloud-based computing environment, the method comprising:
providing the primary instance to a remote client device, wherein the primary instance is configured to communicatively couple to a remote client device via a network interface in the cloud-based computing environment, wherein the primary instance comprises a plurality of configuration items and a plurality of applications;
instantiating a helper instance to the remote client device, wherein the helper instance is configured to communicatively couple to the primary instance, and wherein the helper instance is configured with global scope and configured to perform a new service mapping discovery function;
disabling an old service mapping discovery function in the primary instance executing the helper instance for a period of time to discover service mapping information associated with the primary instance to identify communications between at least two of the applications in the primary instance;
identifying communication paths between two or more configuration items based on the communication paths between the at least two of the applications in the primary instance, wherein the communication paths are associated with a service management function;
associating the service management function in a service map containing the two or more configuration items and the identified communication paths;
updating a first data structure in the helper instance to reflect the association in the service map;

invoking a rule in the helper instance based on the update of the first data structure, wherein the rule is configured to adjust for a schema difference between the first data structure and a second data structure in the primary instance prior to adding information to a synchronization queue, wherein the schema difference between the first data structure and the second data structure is attributable to the update of the first data structure without updating the second data structure;
updating the synchronization queue in the helper instance to contain the discovered service mapping information;
scheduling a synchronization job to transfer at least a portion of the discovered service mapping information from the synchronization queue to the primary instance; and
initiating a trigger in the primary instance to recalculate service mapping information in the primary instance based on the rule and to make the recalculated service mapping information available to other functions executing in the primary instance.

11. The method of claim 10 further comprising:
receiving information pertaining to a change to a configuration item in the primary instance; and
initiating a reverse synchronization from the primary instance to the helper instance to cause the change to the configuration item to be reflected in the helper instance.

12. A non-transitory computer readable medium storing instructions that, when executed by a processor, cause the processor to configure a cloud-based computer system to:
provide a hosted client primary instance to a remote client device, wherein the hosted client primary instance is configured to communicatively couple to the remote client device via a network interface, and wherein the hosted client primary instance comprises a plurality of configuration items and a plurality of applications;
provide a hosted discovery helper instance to the remote client device, wherein the hosted discovery helper instance is configured to communicatively couple to the hosted client primary instance;
recognize, in the hosted discovery helper instance, communications between at least two of the applications in the hosted client primary instance;
identify, in the hosted discovery helper instance, communication paths between two or more of the configuration items of the at least two of the applications based on the recognized communications, wherein the communication paths are associated with a service management function;
associate, in the hosted discovery helper instance, the service management function in a service map containing the two or more configuration items and the identified communication paths;
update a first data structure in the hosted discovery helper instance to reflect the association in the service map;
invoke, in the hosted discovery helper instance, a business rule based on the update of the first data structure, the business rule configured to add information to a queue, wherein the business rule is configured to adjust for a schema difference between the first data structure and a second data structure in the hosted client primary instance prior to adding information to a queue, wherein the schema difference between the first data structure and the second data structure is attributable to the update of the first data structure without updating the second data structure;

synchronize, based on the information added to the queue, information from the first data structure in the hosted discovery helper instance with a corresponding second data structure in the hosted client primary instance; and initiating a trigger in the hosted client primary instance to recalculate service mapping information in the hosted client primary instance based on the business rule and to make the recalculated service mapping information available to other functions executing in the hosted client primary instance.

13. The non-transitory computer readable medium of claim 12, wherein the hosted client primary instance and the hosted discovery helper instance are of different instance versions.

14. The non-transitory computer readable medium of claim 12, wherein the hosted client primary instance and the hosted discovery helper instance have databases that use different schemas.

15. The non-transitory computer readable medium of claim 12, wherein the instructions further cause the cloud-based computer system to receive an update, via the remote client device, to a configuration item.

16. The non-transitory computer readable medium of claim 15, wherein the update indicates addition of a new configuration item causing an update to a table of the second data structure in the hosted client primary instance.

17. The non-transitory computer readable medium of claim 16, wherein the update to the table initiates execution of a trigger containing business logic to update a reverse synchronization control queue.

18. The non-transitory computer readable medium of claim 17, wherein the instructions further cause the cloud-based computer system to synchronize, based on the information in the reverse synchronization control queue, information, corresponding to the addition of the new configuration item, from the hosted client primary instance to the hosted discovery helper instance, the information adding the new configuration item to a data base in the hosted discovery helper instance.

19. The non-transitory computer readable medium of claim 12, wherein the communications between at least two of the applications recognized in the hosted discovery helper instance are recognized using network monitoring techniques.

20. The non-transitory computer readable medium of claim 12, wherein the communications between at least two of the applications recognized in the hosted discovery helper instance are recognized using pattern matching techniques.

* * * * *